United States Patent
Michielsen et al.

(10) Patent No.: US 12,428,111 B2
(45) Date of Patent: Sep. 30, 2025

(54) LIFTING SYSTEM AND METHOD FOR TAKING UP AN ELONGATED OBJECT

(71) Applicant: DEME Offshore BE NV, Zwijndrecht (BE)

(72) Inventors: Jan Maria Koen Michielsen, Antwerp (BE); Kenneth Gerard Vannieuwenhuyse, Sint-Amandsberg (BE); Franky Ecran, Schelle (BE); Dieter Wim Jan Rabaut, Ghent (BE)

(73) Assignee: DEME Offshore BE NV, Zwijndrecht (BE)

( * ) Notice: Subject to any disclaimer, the term of this patent is extended or adjusted under 35 U.S.C. 154(b) by 256 days.

(21) Appl. No.: 17/923,169

(22) PCT Filed: May 4, 2021

(86) PCT No.: PCT/IB2021/053713
§ 371 (c)(1),
(2) Date: Nov. 3, 2022

(87) PCT Pub. No.: WO2021/224779
PCT Pub. Date: Nov. 11, 2021

(65) Prior Publication Data
US 2023/0348028 A1    Nov. 2, 2023

(30) Foreign Application Priority Data

May 4, 2020 (BE) .................................. 2020/5290

(51) Int. Cl.
*B63B 35/00* (2020.01)
*B63B 27/10* (2006.01)
*B66C 23/52* (2006.01)

(52) U.S. Cl.
CPC ............ *B63B 35/003* (2013.01); *B63B 27/10* (2013.01)

(58) Field of Classification Search
CPC ....... B66C 23/52; B63B 35/003; B63B 27/10; B63B 27/08; B63B 77/10; B63B 75/00
See application file for complete search history.

(56) References Cited

U.S. PATENT DOCUMENTS 7,367,464 B1   5/2008  Agostini et al.
8,794,457 B2 *  8/2014  Richter .................. B66C 13/06
                                                    212/274
(Continued)

FOREIGN PATENT DOCUMENTS

CN   106865415 A    6/2017
EP    2490975 B1    6/2014
(Continued)

*Primary Examiner* — Anna M Momper
*Assistant Examiner* — Juan J Campos, Jr.
(74) *Attorney, Agent, or Firm* — The Webb Law Firm

(57) ABSTRACT

Described is a lifting system for taking up an elongate object from a deck of a vessel. The lifting system has a crane arm which is connected to the deck and from which is suspended a take-up frame to which the elongate object can be attached. Also present is a winch setup and control lines connected thereto and configured to control the movement of the elongate object when this object is lifted off the deck. The control lines run from the take-up frame to the winch setup. The winch setup forms part of a support structure which extends from the deck to a height and is intended to be able to absorb the forces acting on the object while it is being lifted off the deck. Also described is a method for taking up an elongate object from a deck of a vessel.

14 Claims, 3 Drawing Sheets

(56) References Cited

U.S. PATENT DOCUMENTS

| | | | |
|---|---|---|---|
| 9,238,569 B2* | 1/2016 | Sørensen | B66D 1/50 |
| 9,346,656 B2* | 5/2016 | May | B66C 13/06 |
| 9,950,910 B2* | 4/2018 | Sørensen | B66C 23/185 |
| 2005/0109724 A1 | 5/2005 | Frumau et al. | |
| 2008/0216301 A1 | 9/2008 | Hansen et al. | |
| 2012/0034061 A1 | 2/2012 | Boroy | |
| 2014/0360015 A1 | 12/2014 | Lohan et al. | |
| 2015/0217838 A1 | 8/2015 | Antonsen | |
| 2017/0015530 A1 | 1/2017 | Southerland, Jr. | |
| 2021/0032079 A1 | 2/2021 | Vehmeijer et al. | |

FOREIGN PATENT DOCUMENTS

| | | |
|---|---|---|
| EP | 3517479 A1 | 7/2019 |
| GB | 2252295 A | 8/1992 |
| JP | H631156 B2 | 4/1994 |
| JP | 2507856 B2 | 6/1996 |
| JP | 2012201219 A | 10/2012 |
| JP | 2020011839 A | 1/2020 |
| KR | 1020180133665 A | 12/2018 |
| WO | 9729947 A1 | 8/1997 |
| WO | 2013015684 A1 | 1/2013 |
| WO | 2014070024 A2 | 5/2014 |
| WO | 2014082641 A1 | 6/2014 |
| WO | 2015122764 A1 | 8/2015 |
| WO | 2015165463 A1 | 11/2015 |
| WO | 2018228809 A1 | 12/2018 |
| WO | 2019125172 A2 | 6/2019 |
| WO | 2020212409 A1 | 10/2020 |

\* cited by examiner

LIFTING SYSTEM AND METHOD FOR TAKING UP AN ELONGATED OBJECT

CROSS-REFERENCE TO RELATED APPLICATIONS

This application is the United States national phase of International Application No. PCT/IB2021/053713 filed May 4, 2021, and claims priority to Belgian Patent Application No. 2020/5290 filed May 4, 2020, the disclosures of which are hereby incorporated by reference in their entirety.

BACKGROUND OF THE INVENTION

Field of the Invention

The invention relates to a lifting system for taking up from a deck of a vessel an elongate object, such as a monopile, a component of a wind turbine such as for instance a wind turbine blade, a topside and other elongate objects. Such objects are generally transported on the deck of the vessel in a substantially horizontal position. The invention likewise relates to a method for taking up an elongate object using the lifting system.

Description of Related Art

The invention will be elucidated with reference to an offshore wind turbine. This reference does not however imply that the invention is limited thereto, and the lifting system and corresponding method can be applied equally well for placing any other elongate object on any ground surface. It is thus for instance possible to apply the invention in the context of arranging other offshore foundation structures, of jetties, of radar and other towers, and also for onshore applications.

Foundations of an offshore wind turbine come in a number of variants, including pile foundations and jacket foundations. A pile foundation is generally applied in relatively limited water depths, while jacket foundations are suitable for greater water depths. A monopile foundation in many cases comprises hollow tubular objects of steel which can have a length of more than 80 m, a diameter of 8 m and more, and a weight which can rise to 1000 tons and more. Jacket foundations often have even greater dimensions. Foundations for wind turbines are moreover becoming increasingly heavier because wind turbines are constantly being scaled up. Because the foundations are also becoming increasingly more sizeable, they are increasingly more difficult to handle.

A known method for placing a foundation pile or foundation jacket on an underwater bottom comprises of taking up the foundation pile or jacket from a vessel with a lifting crane and lowering the foundation pile or jacket onto or into the underwater bottom, optionally via an upending device. The foundation is then uncoupled from the lifting crane.

Taking up of an elongate object such as a foundation pile from a deck of a vessel and displacing the object in substantially horizontal position is a delicate operation, among other reasons because the object can easily become damaged herein. An object suspended in a lifting crane and having the dimensions of a foundation undergoes swinging movements as a result of wave action, wind and other forces exerted on the object, for instance of the lifting crane itself when it is rotated around an axis running perpendicularly of the deck. Such swinging movements are undesirable since they can pose a danger to personnel present on the deck of the vessel, and can also cause damage otherwise.

Different measures can be taken in the prior art to prevent the swinging movements. It is thus possible to perform the operations only in calm conditions. This however reduces the operating time during which work can take place.

Another option relates to orienting the vessel relative to the incoming waves and their direction such that the vessel moves as little as possible. This measure is however not always possible. An object placed on the seabed, such as for instance a jacket foundation, thus generally has a fixed orientation relative to the north. It will be apparent that waves can have any direction or orientation relative to the north. It is therefore often necessary to fall back on performing the operations in relatively calm conditions.

Yet another option relates to keeping control of objects suspended in the lifting crane using so-called tugger lines. Such tugger lines comprise cables which are connected at an outer end to the object and at another outer end to the deck of the vessel, for instance with intervention by personnel present on the deck. With the tugger lines the swinging movement of the object can be damped to greater or lesser extent, although this operation still often poses a risk of damage and to personnel, at least when relatively calm conditions are not relied upon.

There is therefore a need for a lifting system and corresponding method which can at least partially obviate the above stated prior art drawbacks.

SUMMARY OF THE INVENTION

An object of the present invention is therefore to provide a lifting system and a method to be performed with the lifting system, which can be applied in conditions rougher than just calm. Such a lifting system and method can considerably increase the operational working time.

These and other objects are achieved by providing a lifting system as disclosed and a method as disclosed. The invented lifting system for taking up an elongate object from a deck of a vessel comprises a crane arm which is connected to the deck and from which is suspended a take-up frame to which the elongate object can be attached, and further a winch setup and control lines connected thereto and configured to control the movement of the elongate object when this object is lifted off the deck, wherein the control lines run from the take-up frame to the winch setup, wherein a support structure which differs from the crane arm, extends from the deck to a height and is configured to be able to absorb the forces acting on the object while it is being lifted off the deck comprises the winch setup.

Controlling can also comprise of managing and damping the movement of the object.

The control lines which connect the elongate object via the take-up frame to a winch setup present on the support structure can be used to control the object movement such that the object orientation is kept substantially horizontal during lifting with the crane arm. The swinging movement of the object can also be damped. The take-up frame hangs here from at least one carrying hoisting cable for carrying the object weight. The hoisting cable is connected movably to the crane arm.

The control lines preferably do not run in a vertical direction but at an angle to the vertical direction other than zero. The movement of the elongate object can hereby be controlled both in the vertical direction and in a horizontal direction.

Another advantage of the invention relates to the use of the listing system for damping the movements of the object. This results inter alia in better control of swinging movements of the object which may occur during lifting.

Connecting the object to the winch setup via the support structure enables the movement of the object relative to the crane arm and the deck of the vessel to be controlled. In contrast, in the prior art cables are held by personnel on the deck and the orientation of the object, and optionally the swinging movement relative to determined point on the deck, is controlled. When the crane arm moves, the orientation of the object does not automatically follow the crane arm. Because the support structure differs from the crane arm and the crane arm must be able to move, the support structure is inevitably situated at a distance from the crane arm. The horizontal orientation of the object with the control lines can be simplified and better control over the moving object can be obtained hereby. Furthermore, since it is not necessary to have personnel present on deck to handle control lines, the number of people necessary for handling the object can be reduced.

In the context of the present application an elongate object is understood to mean an object with a length and a transverse dimension, wherein the length amounts to at least 5 times the transverse dimension, more preferably at least 6 times, still more preferably at least 7 times, still more preferably at least 8 times, still more preferably at least 9 times, and most preferably at least 10 times the transverse dimension.

According to the invention, the support structure extends from the deck to a height, wherein the height amounts to at least 5 m above the deck of the vessel, more preferably at least 8 m, still more preferably at least 10 m, still more preferably at least 12 m, still more preferably at least 15 m, still more preferably at least 18 m, still more preferably at least 20 m, still more preferably at least 25 m, and most preferably at least 30 m. The support structure differs from lifting cranes present on the deck of the vessel.

The support structure according to the invention is configured to be able to absorb the forces acting on the object while it is being lifted off the deck and, in a preferred embodiment, comprises an existing structure of the vessel, such as the bridge. Such a support structure is strong enough to meet the above stated requirement and makes use of an existing vessel structure.

The advantages of the invention become particularly manifest in an embodiment wherein the winch setup is situated on an upper side of the support structure, and therefore also at a height above the deck of the vessel. The angle formed by the control lines with the take-up frame and the object taken up in the take-up frame is hereby optimized. This results in optimal control of the movements of the taken-up object, this enabling work in rougher seas.

The same result can be achieved with an embodiment wherein the control lines run from the take-up frame to a pulley setup and from there to the winch setup, wherein the pulley setup is more preferably situated on an upper side of the support structure and the winch setup at a lower height. Owing to the pulley setup situated at a relatively great height, the control lines will take up a more horizontal position during lifting of the object, this further improving control of the object.

In a useful embodiment the winch setup is situated on a lower side of the support structure. Maintenance to the winch setup can thus for instance be realized more easily. In this embodiment use can also be made of relatively heavy winches. Placing the winch setup on the lower side furthermore increases the accessibility of the winch setup as compared to a location in a different part of the support structure.

The control lines can run from the take-up frame to a pulley setup which is situated on the support structure and from there to the winch setup of the support structure. An embodiment of the invention relates to a lifting system wherein the winch setup comprises at least two independently controllable winches for at least two control lines. Another embodiment co-acting therewith in synergetic manner is a lifting system wherein the pulley setup comprises at least two independent pulleys for at least two control lines.

The use of pulleys facilitates the redirection of the control lines. A further improved embodiment is further characterized in that the pulley setup is movable relative to the support structure, preferably movable relative to the support structure in a height direction.

A suitable choice of location of the pulleys along the height of the support structure enables suitable adjustment of the stabilizing effect of the take-up frame. If the pulleys are for instance situated relatively close to the lower end of the support structure, the stabilizing forces of the control lines acting on the take-up frame will act in a direction opposite to the tensile force of the hoisting cable connected to the lifting crane after the object is lifted. If the pulleys are on the other hand situated close to the upper end of the support structure, the distance between the pulleys and the take-up frame, i.e. the distance between the pulleys and the object, can be minimized in the fully lifted position of the object. This aids in improving the controlling performance of the control lines in the fully lifted state of the object. It is therefore particularly advantageous for the pulleys to be disposed movably in the height direction of the support structure. The pulleys can hereby follow the lifting process, wherein the location of the pulleys relative to the take-up frame, i.e. relative to the object, is continuously optimized.

According to another embodiment, the inventive lifting system can further comprise a tensioning device which acts on the winch device or on the control lines in order to hold the control lines under tension while the elongate object is being taken up. Owing to the tensioning or biasing of the control lines, the object can be kept particularly stable during the lifting process. The tensioning device can further comprise a control setup which acts on the winch setup or on the control lines, so that the horizontal orientation of the object can be controlled by the degree of tension of the control lines.

Another aspect of the invention relates to a method for taking up an elongate object from a deck of a vessel, comprising the steps of:
attaching the elongate object to a take-up frame which is suspended from a crane arm connected to the deck;
lifting the object off the deck using the crane arm and controlling the orientation of the elongate object with a winch setup and control lines which are connected thereto and which run from the take-up frame to the winch setup;
wherein a support structure which extends from the deck to a height and which is configured to absorb the forces acting on the object while it is being lifted off the deck comprises the winch setup.

The taken-up object is preferably held in a substantially horizontal position during lifting using the control lines.

An embodiment of the invented method has the feature that the support structure comprises an existing structure of the vessel, such as the bridge.

In other embodiments methods are provided wherein the winch setup is situated on an upper side of the support structure, and/or wherein the control lines run from the take-up frame to a pulley setup and from there to the winch setup, and/or wherein the pulley setup is situated on an upper side of the support structure and the winch setup at a lower height, and/or wherein the winch setup is situated on a lower side of the support structure.

A method according to another embodiment has the feature that the pulley setup is moved relative to the support structure, and is preferably moved relative to the support structure in a height direction of the support structure.

The winch setup can comprise at least two winches for at least two control lines, wherein the two winches are controlled independently, if desired. The pulley setup can also comprise at least two independent pulleys for at least two control lines.

The control lines which are used in another embodiment of the inventive method can further be held under bias when the elongate object is lifted. By biasing the control lines the object can be kept particularly stable during the lifting process. As soon as the object is lifted higher than the point at which the control lines reach the support structure, the orientation of the object in particular can be fixed safely, since the hoisting cable and the control lines pull on the object (with interposing of the take-up frame) in more or less opposite directions. If the forces acting on the object due to the hoisting cable on one side and the control lines on the other are great enough in this situation, the object is kept stable by these forces which act on three different contact points of the take-up frame to which the object is attached (one contact point for the hoisting cable and at least two contact points for the control lines).

The tensioning device provides for a damping of the movement of the object. When the object moves away from the winch, the tension in the control lines will increase, while the tension in the control lines will decrease when the object moves toward the winch. Energy is dissipated in this way.

The embodiments of the invention described in this patent application can be combined in any possible combination of these embodiments, and each embodiment individually can form the subject matter of a divisional patent application.

BRIEF DESCRIPTION OF THE FIGURES

The invention will now be elucidated with reference to the following figures, without otherwise being limited thereto. In the figures.

DESCRIPTION OF THE INVENTION

Figure 1:
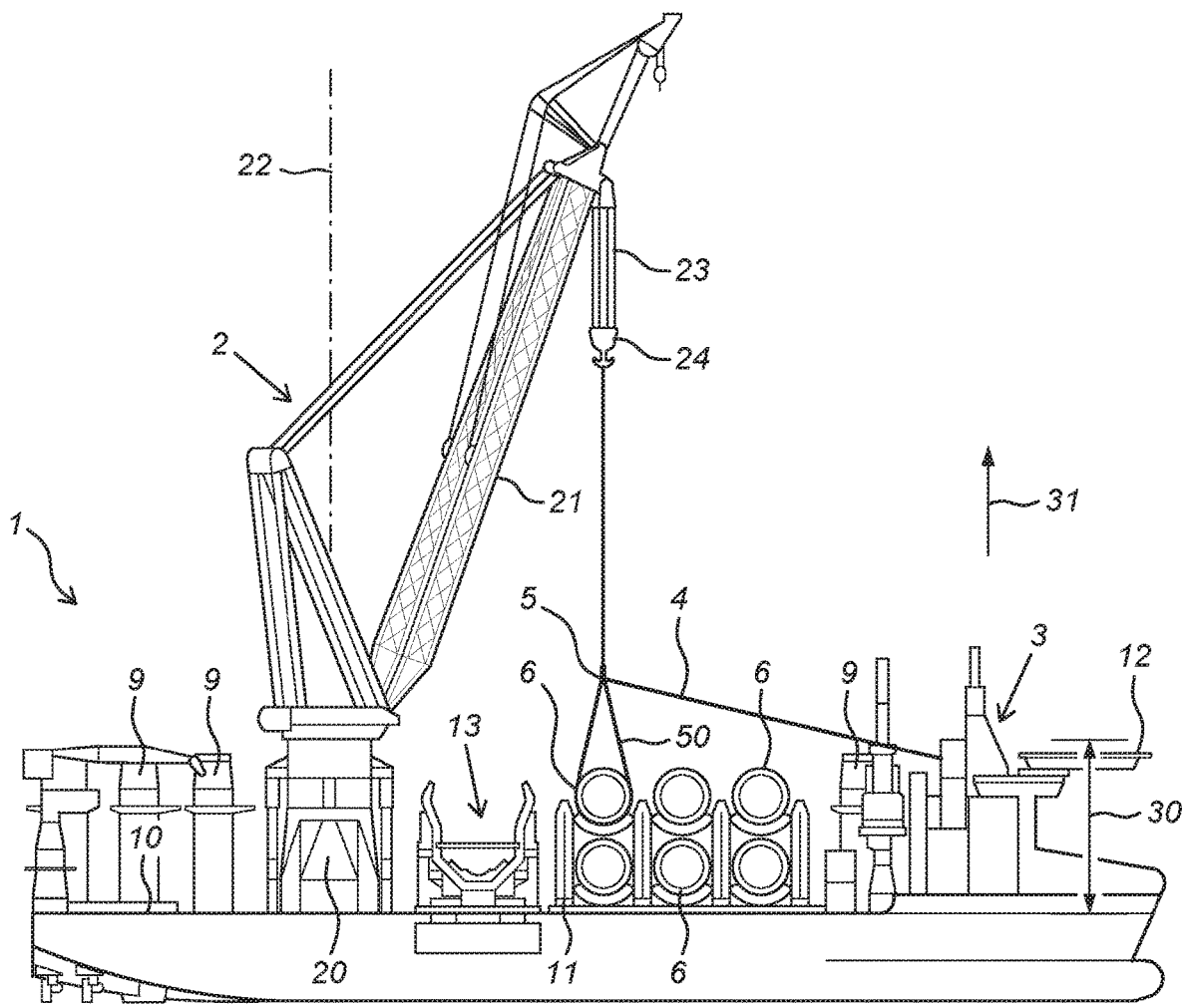
FIG. 1 is a schematic side view of a vessel provided with a lifting system according to an embodiment of the invention.

Referring to FIG. 1, a vessel 1 is shown which is provided with a lifting system (2, 3, 4) according to an embodiment of the invention. The vessel 1 can be provided with a storage rack 11 for a number of monopile 6, with a number of transition pieces 9 stored in upright position and, if desired, with a helipad 12. In order to bring the elongate objects, such as monopiles 6 and transition pieces 9, into a vertical position so as to lower them onto the underwater bottom (monopile) or onto an already placed monopile (transition piece) in this position the vessel 1 can be provided on a side edge thereof with a gripping device 13, this being movement-compensated if desired.

The lifting system (2, 3, 4) comprises a lifting means in the form of a lifting crane 2 placed on a deck 10 of the autonomously driven vessel 1. The lifting crane 2 comprises a base 20 connected to deck 10 and a crane arm 21, which can be rotated around a rotation axis 22 running perpendicularly of deck 10 of vessel 1. Running over crane arm 21 of lifting crane 2 is a number of hoisting cables 23 to which a hoisting block 24 is attached.

Suspended from crane arm 21 is a take-up frame 5 to which an elongate object such as a monopile 6 can be attached by means of slings 50 suspended from the take-up frame. The lifting system (2, 3, 4) further comprises a support structure 3 extending from deck 10 to a height 30. In the shown embodiment support structure 3 is formed by an existing structure of the vessel, namely the bridge. Support structure 3 can however also comprise a structure erected separately for the purpose, for instance a lattice structure erected on deck 10. Support structure 3 is configured to be able to absorb the forces acting on a monopile 6 or other object while it is being lifted off deck 10.

Figure 2:
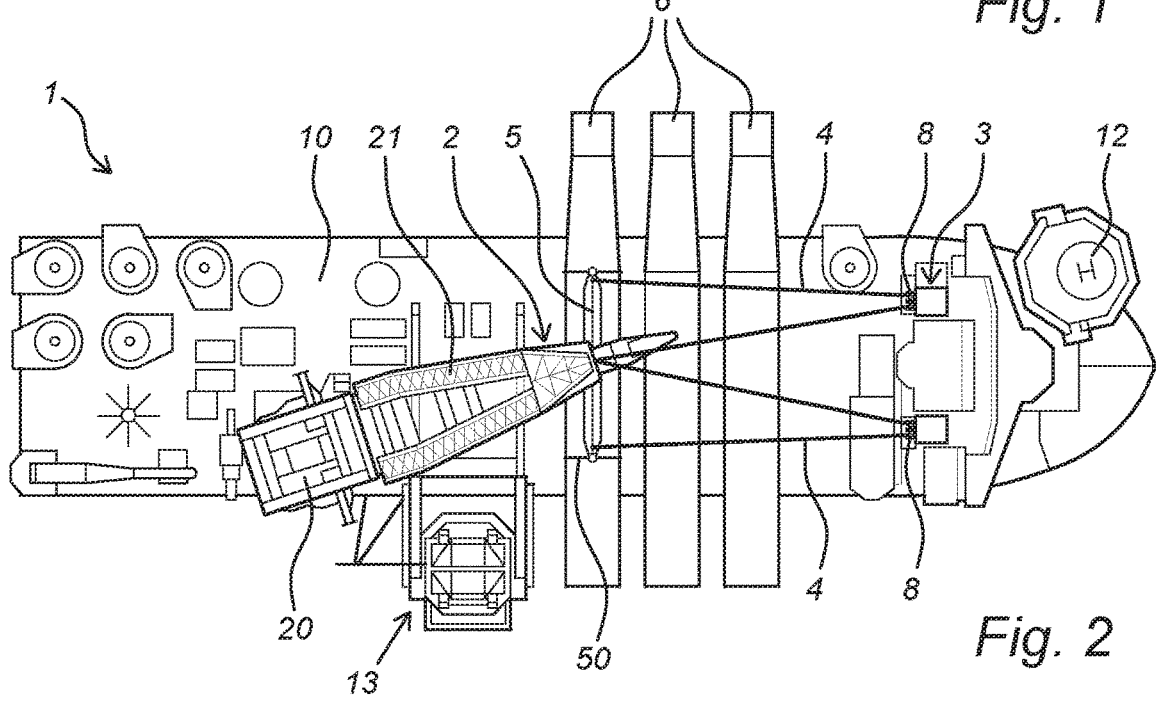
FIG. 2 is a schematic top view of the vessel shown in FIG. 1, which is provided with a lifting system according to an embodiment of the invention.
Figure 3:
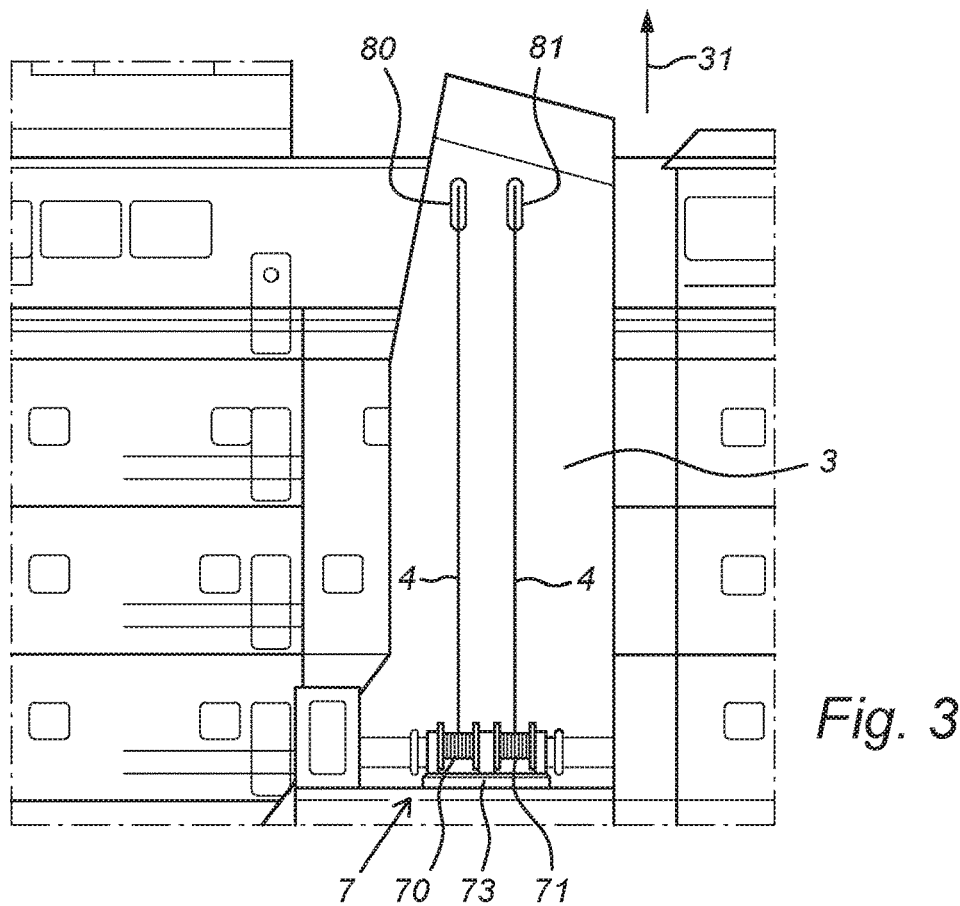
FIG. 3 is a schematic side view of a support structure according to an embodiment of the invention.
Figure 4:
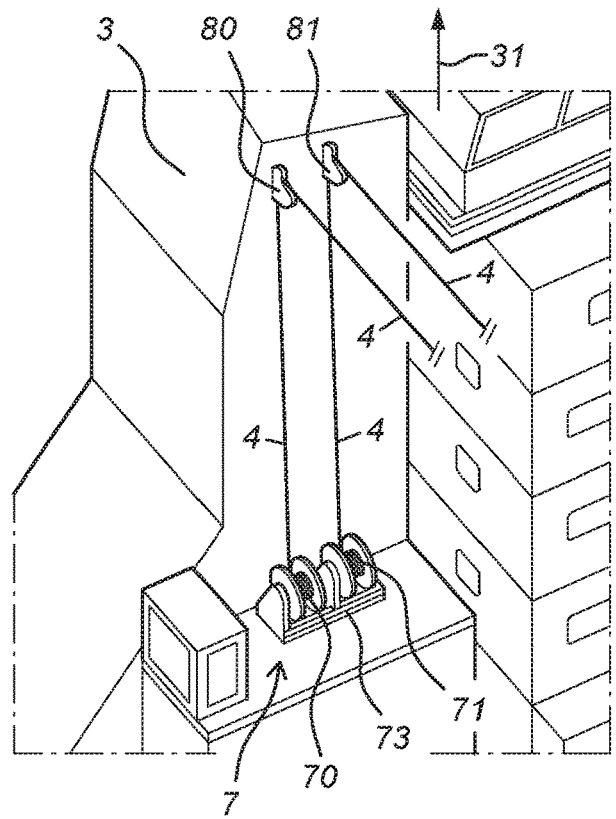
FIG. 4 is a schematic perspective view of the embodiment shown in FIG. 3 of a support structure according to the invention; and, finally

Arranged on a lower side of support structure 3 is a winch setup 7. Winch setup 7 can also be situated at a determined height above deck 10. In the shown embodiment winch setup 7 comprises two independently controllable winches (70, 71) which operate two control lines 4. Arranged on an upper side of support structure 3 is a pulley setup 8 comprising two independent pulleys (80, 81) for the two control lines 4. From the winch setup 7 shown clearly in FIGS. 3 and 4, control lines 4 run over the pulley setup 8 arranged at greater height and from there to take-up frame 5. As shown in FIG. 2, control lines 4 can be attached to outer ends of take-up frame 5, but also to a middle part thereof. Operating the winches (70, 71) independently of each other enables the orientation of take-up frame 5 and of a monopile 6 received therein to be manipulated. Control lines 4 are intended to control the orientation of a monopile 6 when this monopile 6 is lifted from a storage rack 11 off deck 10, wherein control lines 4 run from take-up frame 5 to winch setup 7.

Pulley setup 8 and, if desired, also winch setup 7 can be embodied movably in a height direction 31 relative to support structure 3, for instance by having the setup (7, 8) in question run on a rail guide. In the context of the present application movably is understood to mean that the setup (7, 8) in question can be moved in height direction 31 and fixed in variable height positions.

According to an embodiment, the lifting system (2, 3, 4) can further comprise a tensioning device 73 which acts on winch device 7 in order to hold control lines 4 under tension while taking up a monopile 6 or other elongate object.

Figure 5:
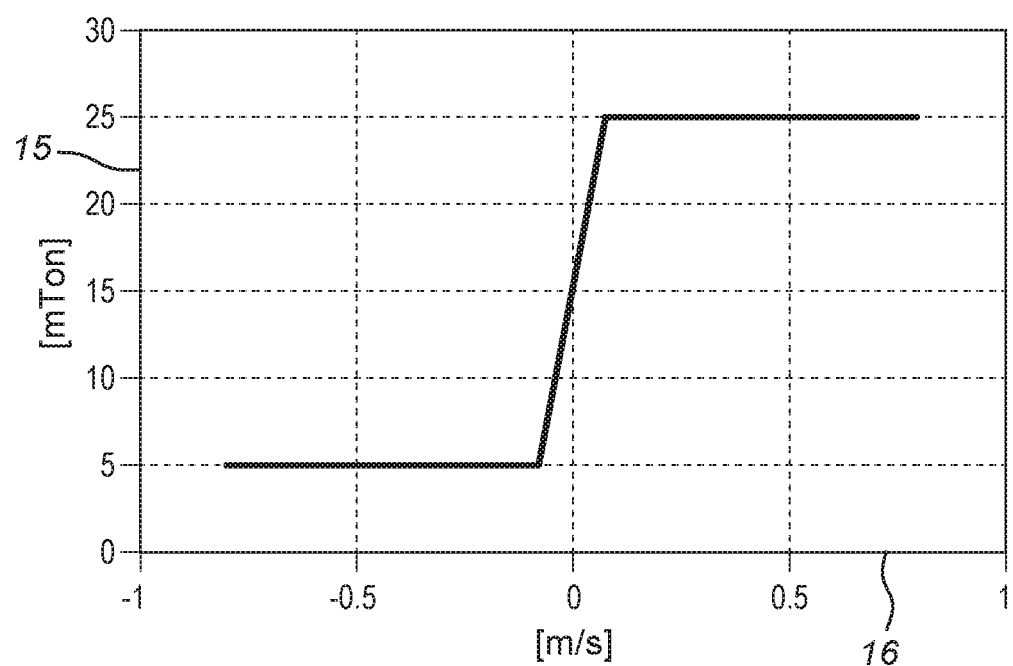
FIG. 5 is a schematic diagram of the output of a tensioning device according to an embodiment of the invention, which acts on the winch device.

An example of a tension/velocity diagram typically generated by tensioning device 73 is shown in FIG. 5. In a damping mode the tension 15 applied by the tugger winches (70, 71) can change with the velocity of hauling in and paying out 16 of control lines 4, for instance as according to the shown linear progression. A bias is typically set by the tugger winches (70, 71), for instance 15 tons. This tension can increase to an upper limit of for instance 25 tons when control lines 4 are payed out and decrease again to a lower limit of for instance 5 tons when control lines 4 are hauled in. With this setting of the tensioning device 73 the control lines 4 always remain under tension, this enhancing control of take-up frame 5.

Swinging movements of monopile 10 can be damped with the tensioning device 73. When the monopile 10 moves away from the tugger winches (70, 71), the tension in control lines 4 will increase as according to the linear progression of FIG. 5. When monopile 10 moves toward the tugger winches (70, 71), the tension in control lines 4 will decrease as according to the linear progression of FIG. 5. Energy is consumed in this way.

With the invented lifting system (2, 3, 4) a monopile 6 or other elongate object can be advantageously taken up from the deck 10 of vessel 1. A typical method comprises of attaching the monopile 6 or other elongate object to the take-up frame 5 which is suspended from a crane arm 21 connected to deck 10. Monopile 6 is then lifted off deck 10 with crane arm 21 and the orientation of the monopile 6 is controlled with the winch setup 7 and the control lines 4 which are connected thereto and which run from take-up frame 5 to winch setup 7. The control lines preferably run here from take-up frame 5, via pulley setup 8 to winch setup 7. During lifting, the tensioning device 73 acting on winch device 7 or on control lines 4 ensures that control lines 4 remain tensioned while taking up the monopile 6.

The lifting system allows optimal control line angles relative to deck 10. The crane winches which are sometimes applied in the prior art for damping the movement of a lifted monopile 6 do not do this. It can moreover be difficult to integrate the setting of the damping control in the known crane winches.

With the embodiment of the invented lifting system (2, 3, 4), described above in detail, an elongate object, particularly a monopile 6 of a wind turbine, can be taken up from a storage rack 11 in controlled manner and then, if desired via gripping device 13, be placed on a ground surface, particularly an underwater bottom, this in worse weather conditions than is possible with the known method. The risk of damage to the elongate object can be reduced here.

LIST OF REFERENCE NUMERALS 1 vessel
2 lifting crane
3 support structure
4 control lines
5 take-up frame
6 monopile
7 winch setup
8 pulley setup
9 transition piece
10 deck of the vessel
11 storage rack
12 helipad
13 gripping device
20 crane base
21 crane arm
22 vertical rotation axis
23 hoisting cables of the lifting crane
24 hoisting block of the lifting crane
30 height of the support structure
31 height direction
50 slings of the take-up frame
70 first independently controllable winch
71 second independently controllable winch
73 tensioning device
80 first independent pulley
81 second independent pulley

The invention claimed is:

1. A vessel comprising a lifting system for taking up an elongate object from a deck of the vessel, comprising a crane arm which is connected to the deck and from which is suspended a take-up frame to which the elongate object can be attached, and further a winch setup and control lines connected thereto and configured to control the movement of the elongate object when this object is lifted off the deck, wherein the control lines run from the take-up frame to a pulley setup and from there to the winch setup, which pulley setup and winch setup are provided on a support structure, which differs from the crane arm, extends from the deck of the vessel to a height and is configured to be able to absorb the forces acting on the object while the object is being lifted off the deck, and wherein the pulley setup is movable relative to the support structure in a height direction.

2. The vessel according to claim 1, wherein the support structure comprises an existing structure of the vessel.

3. The vessel according to claim 1, wherein the pulley setup is situated on an upper side of the support structure and the winch setup at a lower height.

4. The vessel according to claim 1, wherein the winch setup is situated on a lower side of the support structure.

5. The vessel according to claim 1, wherein the winch setup comprises at least two independently controllable winches for at least two control lines.

6. The vessel according to claim 1, wherein the pulley setup comprises at least two independent pulleys for at least two control lines.

7. The vessel according to claim 1, further comprising a tensioning device which acts on the winch device or on the control lines in order to hold the control lines under tension while the elongate object is being taken up.

8. A method for taking up an elongate object from a deck of a vessel, comprising the steps of:
providing a vessel in accordance with claim 1;
attaching the elongate object to the take-up frame which is suspended from the crane arm connected to the deck of the vessel;
lifting the object off the deck using the crane arm and controlling the movement of the elongate object with the winch setup and control lines which are connected thereto and which run from the take-up frame to the pulley setup and from there to the winch setup; wherein the pulley setup and winch setup are provided on the support structure which differs from the crane arm, extends from the deck to a height and absorbs the forces acting on the object while the object is being lifted off the deck,
wherein the pulley setup is moved relative to the support structure in a height direction.

9. The method according to claim 8, wherein the support structure comprises an existing structure of the vessel.

10. The method according to claim 8, wherein the pulley setup is situated on an upper side of the support structure and the winch setup at a lower height.

11. The method according to claim 10, wherein the winch setup is situated on a lower side of the support structure.

12. The method according to claim 8, wherein the winch setup comprises at least two winches for at least two control lines, and the two winches are controlled independently.

13. The method according to claim 8, wherein the pulley setup comprises at least two independent pulleys for at least two control lines.

14. The method according to claim 8, wherein a tensioning device acts on the winch device or on the control lines and holds the control lines under tension while the elongate object is being taken up.

\* \* \* \* \*